May 8, 1951
G. H. GLOSS
2,552,314
MAGNESIUM HYDROXIDE PRODUCT AND PROCESS FOR THE
MANUFACTURE OF SAID MAGNESIUM HYDROXIDE PRODUCT
Filed July 18, 1947
3 Sheets-Sheet 1
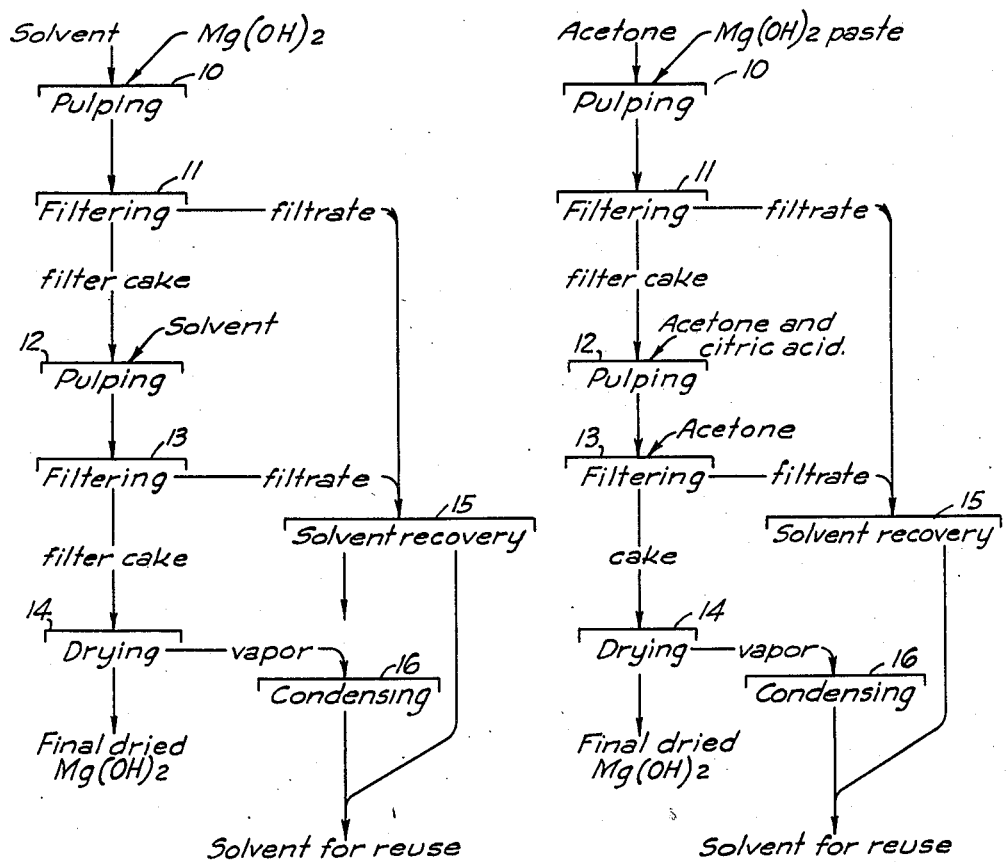
FIG_1_
FIG_2_
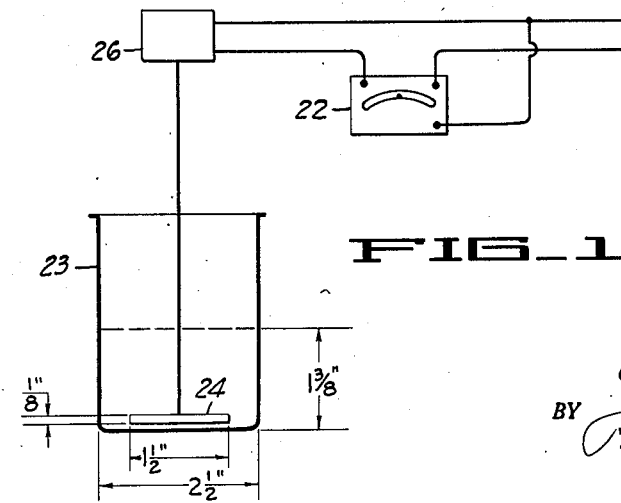
FIG_11_
INVENTOR.
Gunter H. Gloss
BY
Paul D. Flehr
ATTORNEY

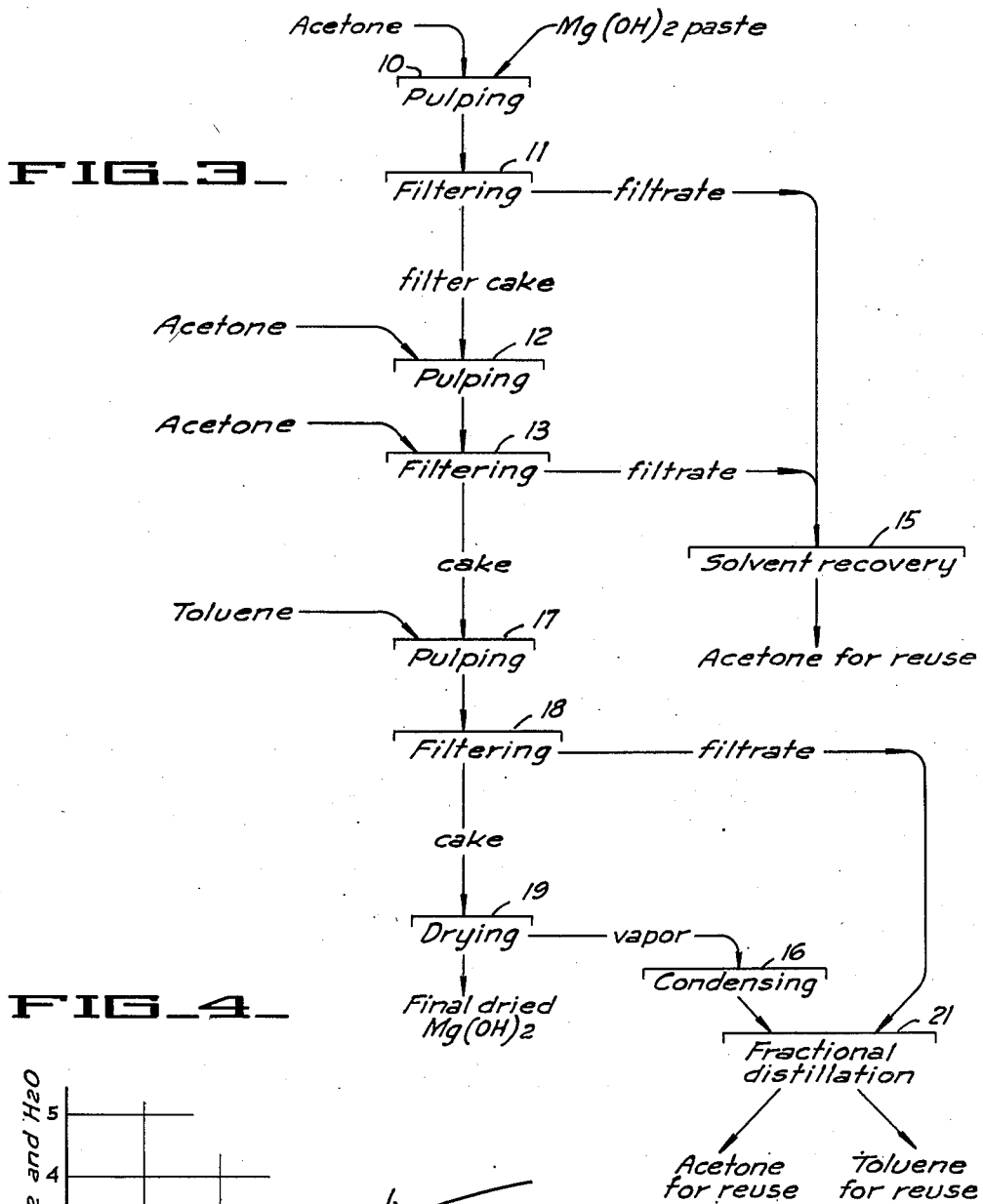

May 8, 1951  G. H. GLOSS  2,552,314
MAGNESIUM HYDROXIDE PRODUCT AND PROCESS FOR THE
MANUFACTURE OF SAID MAGNESIUM HYDROXIDE PRODUCT
Filed July 18, 1947  3 Sheets-Sheet 3
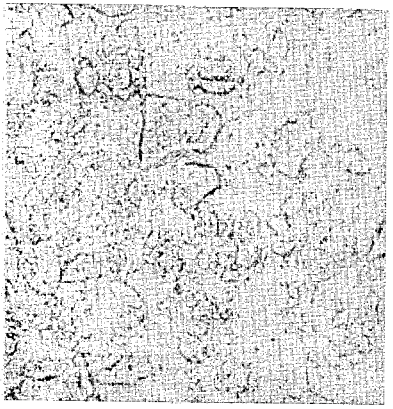
FIG_5_
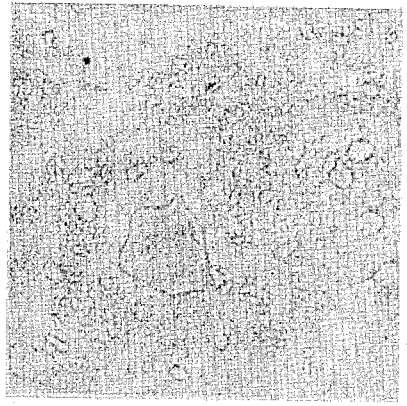
FIG_6_
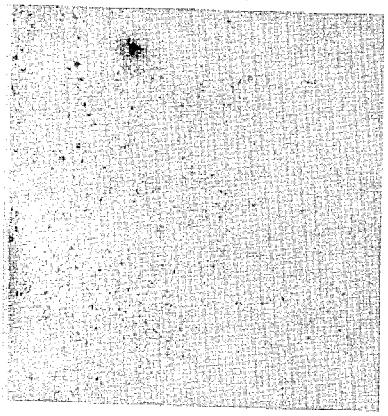
FIG_7_
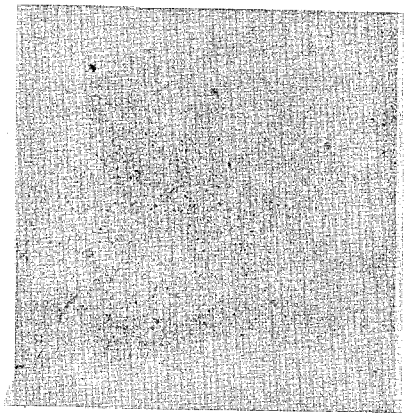
FIG_8_
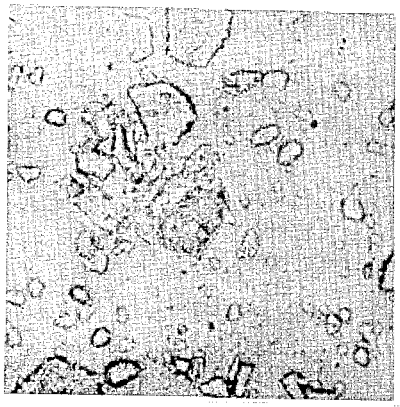
FIG_9_   FIG_10_
INVENTOR.
Gunter H. Gloss
BY
ATTORNEY Patented May 8, 1951

2,552,314

UNITED STATES PATENT OFFICE 2,552,314

MAGNESIUM HYDROXIDE PRODUCT AND PROCESS FOR THE MANUFACTURE OF SAID MAGNESIUM HYDROXIDE PRODUCT

Gunter H. Gloss, Redwood City, Calif., assignor to Marine Magnesium Products Corporation, South San Francisco, Calif., a corporation of Delaware Application July 18, 1947, Serial No. 761,905

5 Claims. (Cl. 23—201)

This invention relates generally to a new article of manufacture, namely a new magnesium hydroxide having special properties, and to processes for manufacture of the same.

Various types of magnesium hydroxide are used for a wide variety of purposes in many industries. Relatively pure forms of magnesium hydroxide are used in the pharmaceutical trade as milk of magnesia, and also in the cosmetic industry. Grades of lesser purity have been found useful as neutralizers in various industrial processes.

It has been known that magnesium hydroxide varies in physical and chemical characteristics depending upon the origin of the material from which the magnesium hydroxide is made, and depending upon the processing employed. For example in the manufacture of a magnesium hydroxide by methods involving precipitation from a brine containing convertible magnesium salt, certain characteristics of the resulting precipitate, particularly particle size, are dependent upon the way in which the precipitation is carried out. One particular step of the processing definitely affects the properties of the final magnesium hydroxide. I have reference to the drying operation employed, in which an aqueous suspension of the material is directly dried by evaporation of moisture. For example if a suspension of magnesium hydroxide in which the magnesium hydroxide particles are extremely fine, is directly dried to produce a dry solid or powdered product, it is difficult if not impossible to redisperse the powdered material in water to produce a suspension like that originally employed. As will be presently pointed out, I have found that this was due to a cementing action between the particles of the magnesium hydroxide, which occurs during the drying operation. For this reason when precipitated magnesium hydroxide is sold to the pharmaceutical trade for the manufacture of milk of magnesia, it is shipped as a hydrous paste in drums, instead of in dry powdered form.

It is an object of the present invention to provide a process making possible the production of a dry solid magnesium hydroxide having a relatively low apparent density, and capable of being readily dispersed in water to form a remarkably stable suspension.

Another object of the invention is to provide a new article of manufacture in the form of a magnesium hydroxide having novel physical and chemical characteristics.

Another object of the invention is to provide a process for the manufacture of a dry magnesium hydroxide which is relatively stable with respect to absorption of moisture and carbon dioxide from the atmosphere.

Another object of the invention is to provide a dry magnesium hydroxide as a new article of manufacture, which is stabilized with respect to absorption of moisture and carbon dioxide from the atmosphere.

Additional objects and features of the invention will be apparent from the following description in which the preferred embodiments have been set forth in detail in conjunction with the accompanying drawing.

Referring to the drawing:

Figure 1 is a flow sheet illustrating one manner of carrying out the process;

Figure 2 is a flow sheet illustrating another manner of carrying out the process;

Figure 3 is a flow sheet illustrating a more elaborate procedure for carrying out the process;

Figure 4 is a curve comparing absorption of carbon dioxide and water for products made according to my invention with magnesium hydroxide prepared by conventional processes;

Figures 5 to 10 inclusive are microphotographs as follows:

Figures 5 and 6 show dry magnesium hydroxides made in accordance with my process and crushed to minus 200 mesh.

Figure 7 shows a sample of ordinary milk of magnesia previous to filtration or drying, enlarged to the same magnification.

Figure 8 shows a milk of magnesia made by resuspending the citrate-protected material as described in Example 7 (column 7).

Figure 9 shows magnesium hydroxide made by oven drying without utilizing my process; and Figure 10 shows a dry magnesium hydroxide made by spray drying a suspension of magnesium hydroxide.

(See samples of Figures 5–10 inclusive which are magnified 1:450.)

The present process involves a novel procedure for converting magnesium hydroxide to dry material. Briefly the present process involves one or more washing operations in which the magnesium hydroxide is washed with a non-aqueous liquid to displace water, and subsequently the non-aqueous liquid is removed as by drying to form the final product. Thus an aqueous suspension of magnesium hydroxide is washed with any one of a number of non-aqueous liquids, such as alcohol or acetone, and subsequently remaining alcohol or acetone is removed by evaporation to form the final product.

The magnesium hydroxide produced as described above possesses characteristics which distinguish it from magnesium hydroxide obtained by drying the same suspension according to conventional methods. The extent to which the properties differ over properties obtained by conventional drying methods, has been found to be dependent upon the character of the original magnesium hydroxide suspension, and the way in which the washing is carried out. Assuming (as I prefer) that one starts with a magnesium hydroxide suspension in which the bulk of the particles have relatively small size (i. e. less than 3.0 microns in diameter), remarkable properties are obtained in the resulting dry magnesium hydroxide, particularly in that this material can be readily dispersed in water with a relatively small amount of simple agitation to produce a highly stable suspension. The apparent density of such a material will range from about 5 to 12 pounds per cubic foot, whereas many dry magnesium hydroxides obtained from conventional drying methods provide apparent densities ranging from 19 to 30 pounds per cubic foot. The dry magnesium hydroxide produced by my process can be calcined to form a new magnesium oxide of low apparent density.

My process can be carried out according to any one of a number of procedures. Thus an aqueous suspension of the magnesium hydroxide, in paste form, can be pulped with a non-aqueous organic solvent like alcohol or acetone, which is miscible with water, and the resulting suspension subjected to filtration to remove the magnesium hydroxide together with some remaining solvent (and traces of water) as a filter cake. This filter cake is then dried, preferably at temperatures well below the boiling point of water, to produce a magnesium hydroxide in dry solid form. This material can be crushed or ground to form a powder. The washing operation can be repeated one or more times before final drying.

For the last or latter washing stages it has been found possible to use a non-aqueous water immiscible solvent, such as benzene or carbon tetrachloride. As will be presently explained, in the treatment of magnesium hydroxide suspensions in which the bulk of the particles are less than 3.0 microns in diameter, such washing affords a further reduction in apparent density.

With respect to suitable water miscible solvents which can be used for carrying out the washing operation, reference can be made to acetone, ethyl or propyl alcohol. All of these solvents are desirable in that they are miscible with water, they have boiling points at ordinary atmospheric pressures well below 100° C., they are inert toward magnesium hydroxide, and their use does not cause an undesirable contamination of the product. As water immiscible solvents, I can make use of any one of a large number of materials such as benzene, carbon tetrachloride, perchlorethylene, xylene, toluene and petroleum ether. Solvents having boiling points in excess of 150° C. are not recommended. It is probable that other or related solvents can be employed, provided essential comparable characteristics are provided. Contrary to what might be expected, the solvent methanol will not give the results desired. When magnesium hydroxide particles of relatively small size are placed in methanol, a part of the hydroxide forms a colloidal solution, and the remainder is difficult to remove by filtration. This is probably due to the high specific inductive capacity of methanol (31.2). The water miscible solvents employed should thus have at least 2 carbon atoms in their molecules.

A dry magnesium hydroxide made in accordance with my process as described above, forms a useful article of manufacture which can be sold and used for many purposes. It tends to reabsorb moisture from the air, and in common with all magnesium hydroxide it also reacts with carbon dioxide of the atmosphere to effect a gradual conversion from magnesium hydroxide to magnesium carbonate. I have found that this dry magnesium hydroxide can be stabilized against both absorption of moisture and carbon dioxide from the atmosphere, by a simple procedure which affords a protective coating upon the particles. In the present instance such stabilizing of the product is effected by causing a minor part of the product to react with citric acid, thereby causing the particles of the material to be protected by a coating of magnesium citrate. A small amount of magnesium citrate is harmless to the product where the product is to be used for pharmaceutical preparations. While citric acid is preferable and its effectiveness has been verified, it is believed possible to use other weak acids which are soluble in the solvents employed (like acetone), which react to form magnesium salts insoluble in acetone, and which form magnesium salts which to some extent are soluble in water. Such acids are tartaric and formic.

To produce a stabilized product as described above, I prefer to proceed by dissolving a suitable amount of citric acid in the water miscible solvent which is used in one of the washing operations. The citric acid reacts with the magnesium hydroxide, and magnesium citrate thus produced remains on the particles because it is insoluble in the solvent. When the product is intended for pharmaceutical purposes, the amount of citric acid employed may vary whereby the percentage of magnesium citrate in the final product will be between reasonable limits of say 1 to 10 percent.

Aside from stabilizing the product against absorption of moisture from the air, and reaction with carbon dioxide of the atmosphere, treatment with citric acid also has the surprising effect of further reducing the apparent density of the material, assuming that the material is one of relatively fine particle size. For example, without the use of citric acid, I have been able to produce a product of fine particle size having an apparent density in the neighborhood of 7 pounds per cubic foot, by a series of washing operations with a water miscible solvent like acetone, and a final washing with a water immiscible solvent like carbon tetrachloride. By the addition of 5.1 percent of citric acid (or about 5 grams of citric acid to 100 grams of $Mg(OH)_2$ to final washing with acetone, I have reduced the apparent density of such material to about 5 pounds per cubic foot. This is due to the fact that, as may be seen from the microphotographs in Figure 8, the magnesium citrate coating around the individual particles prevents these from forming a homogeneous mass during the drying operation, and keeps them separated from each other.

Stabilizing the magnesium hydroxide in the manner described above does not impair ability to be readily dispersed in water with a relatively small amount of stirring or agitation, to form a milk of magnesia suspension which is remarkably stable with respect to settling out when standing.

As previously stated my invention produces particularly remarkable results when applied to magnesium hydroxide of relatively fine particle size, such as where the bulk of the particles are less than 3.0 microns in diameter. As is well known to those skilled in the art, magnesium hydroxide of fine particle size, and such as is suitable for manufacture of pharmaceutical milk of magnesia, can be produced by precipitation of magnesium hydroxide from brines or solutions containing convertible magnesium salts. For example, one can proceed to react a solution of epsom salts with a caustic, or one can precipitate sea water or like brine by a procedure such as disclosed in Patent No. 2,089,399. Magnesium hydroxide precipitated in this manner is frequently referred to as being amorphous or colloidal, although X-ray analysis reveals that the material is not amorphous, but consists of extremely fine crystals. Magnesium hydroxide precipitated in this manner (if not subjected to conventional drying) is capable of forming a stable pharmaceutical milk of magnesia, that is, a milk of magnesia which can be stored for long periods of time, without appreciable settling. After producing a suitable magnesium hydroxide of fine particle size by precipitation, the precipitated material should be washed with fresh water to produce the desired degree of purity, before being used in the present process.

Figure 1 is a flow sheet illustrating one simple procedure for carrying out my process. An aqueous magnesium hydroxide suspension, in the form of a paste, is pulped with a solvent such as acetone. Assuming that the paste contains in the neighborhood of 30 percent solids, about 1½ liters of solvent can be used for each pound of the paste. During pulping 10, the water is dissolved in the solvent. This suspension is then supplied to the filtering operation 11, where the solids are removed as the filter cake, with the filter cake consisting of solvent with some residual water. The filter cake passes to a second pulping operation 12, where it is repulped with solvent. This suspension is then subjected to filtration 13 and the filter cake thus formed is relatively free of water. This filter cake is shown being dried at 14 to produce a final dried magnesium hydroxide. The final product is generally recovered from the drying operation in the form of a friable solid, which can be readily crushed or ground to minus 200 mesh.

To make the process economical, it is desirable to recover solvent from the filtrate, and from the drying operation. Thus the filtrate is shown being supplied to the solvent recovery operation 15, and the vapor from the drying operation 14 is supplied to the condensing operation 16. The recovered solvent can then be reused for the pulping operation 10 and 12. It is desirable to have the drying operation 14 under a partial vacuum, as for example a vacuum of from 15 to 20 inches of mercury. The solvent recovery can be carried out by fractional distillation or by treating the filtrate with chemicals capable of causing a separation between the aqueous and the non-aqueous fraction. For example I can add a solid salt like calcium chloride to the filtrate whereby the salt forms a saturated calcium chloride solution with water. The calcium chloride solution separates from the solids by gravity, whereby the two fractions thus formed can be separately withdrawn. The calcium chloride solution can be dried to recover solid calcium chloride for reuse in the process.

The flow sheet of Figure 2 shows a modified procedure in which the pulping operation 12 receives acetone together with citric acid, for the purpose previously described. The citric acid reacts with a minor part of the magnesium hydroxide in the pulping operation. The filter cake in the filtering operation 13 is shown being again washed with acetone, before discharge of the cake to the dryer 14. The procedure of this flow sheet is well adapted for the production of a magnesium hydroxide stabilized with respect to absorption of moisture and carbon dioxide from the atmosphere, and is suitable for pharmaceutical purposes.

The flow sheet of Figure 3 illustrates a procedure in which both water miscible and water immiscible solvents are employed. The pulping and the filter washing operations 10, 11, 12 and 13 are indicated being carried out by use of acetone. Further pulping 17 of the filter cake from 13 is shown being carried out by use of water immiscible toluene. The suspension from this pulping operation is subjected to filtering operation 18, and the filter cake is then subjected to drying at 19 to produce the final dried material. The filtrate and also the vapor from the drying operation can be suitably treated for recovery of the solvents employed. Thus the filtrate from operations 11 and 13 is shown being subjected to solvent recovery 15 to produce acetone for reuse. Filtrate from 18 and condensed vapor from the drying operation 19 are shown being subjected to fractional distillation at 21, for recovery of the actone and the toluene.

In order to facilitate a better understanding of the process, and an understanding of the characteristics of the products produced, several specific examples can be cited as follows:

*Example 1*

An aqueous magnesium hydroxide suspension was subjected to filtration, and the filtrate washed with ethyl alcohol. About 2 liters of alcohol were used for about 1 pound of the filter cake. The resulting washed cake was then dried at a temperature of the order of 80° C. The resulting dried product was a friable solid, which when crushed to form a powder of minus 200 mesh afforded an apparent density of about 11 pounds per cubic foot.

*Example 2*

A magnesium hydroxide suspension was subjected to filtration, and the filter cake washed twice with acetone. The washed cake was then dried under partial vacuum at a temperature of the order of 60° C. The resulting product was a dry, friable solid which when crushed or ground to minus 200 mesh afforded an apparent density of 10.6 pounds per cubic foot.

*Example 3*

An aqueous magnesium hydroxide suspension was filtered, and the filter cake washed four times with acetone. The resulting product when crushed to minus 200 mesh had an apparent density of 7.1.

*Example 4*

Magnesium hydroxide suspension as in Example 1 was subjected to filtration, and the filter cake washed three times with acetone and once with ethyl benzene. The cake was then dried under partial vacuum at a temperature of the order of 80° C. The resulting dried material when crushed to minus 200 mesh had an apparent density of 6.6 pounds per cubic foot.

Example 5

Magnesium hydroxide paste as used in the above examples, and containing 30% magnesium hydroxide, was pulped with acetone. 1½ liters of acetone were used for each pound of the magnesium hydroxide paste. This suspension was then subjected to filtration, and the resulting filter cake repulped with 1½ liters of acetone. This suspension was then subjected to filtration, and the filter cake washed once with ½ liter of acetone. The resulting washed filter cake was then subjected to drying under partial vacuum, to produce the final dried magnesium hydroxide. The filtrate was treated with calcium chloride in the manner described with reference to Figure 2, to recover the solvent. The resulting dried material when crushed to minus 200 mesh had an apparent density of 9.7 pounds per cubic foot.

Example 6

The filter cake produced in Example 5 before drying was repulped with 1½ liters of toluene, after which the suspension was filtered, and the filter cake subjected to drying under partial vacuum at a temperature of the order of 80° C. The dried material when crushed to minus 200 mesh had an apparent density of 5.9 pounds per cubic foot. It was found that the product could be more readily dispersed in water to form a stable milk of magnesia suspension, than the products of Examples 1 to 5 inclusive.

Example 7

A magnesium hydroxide suspension formed in the same manner as described with reference to the above examples, and containing 7.5% magnesium hydroxide, was subjected to filtration, and the filter cake pulped with pure acetone, using about 700 cc. of acetone for 1000 cc. of the original magnesium hydroxide suspension. This suspension was subjected to filtration, and the filter cake pulped with a 0.27% solution of citric acid in acetone (representing 5.1% of the magnesium hydroxide content on a dry basis). This suspension was subjected to filtration, and the filter cake again pulped with a 0.27% solution of citric acid in acetone. Thereafter, the suspension was subjected to filtration, and the filter cake subjected to drying under partial vacuum, at a temperature of the order of 60° C., to form a soft friable solid mass. The dried product on analysis showed a composition as follows:

|  | Per cent |
|---|---|
| $Mg(OH)_2$ | 90.42 |
| Magnesium citrate | 9.30 |

When crushed to minus 200 mesh, the apparent density was 5.0 pounds per cubic foot. The filtrate did not contain more than 0.01% residual citric acid.

The original magnesium hydroxide employed for all of the foregoing examples was the same in each instance, with the bulk of the particles less than 3.0 microns in diameter, and produced by precipitation from sea water by reaction with a lime slurry according to the procedure of 2,089,399.

All of the dry products obtained by the foregoing examples possessed the property of being readily dispersed in water to form a remarkably stable suspension by simple agitation with ordinary agitating appliances, such as a stirring device or an egg beater. After being redispersed in water, the particle size appeared to be definitely smaller than the particle size of magnesium hydroxide produced by direct drying of the same magnesium hydroxide suspension supplied to the process.

In order to more definitely demonstrate and define the properties of the material, laboratory apparatus such as illustrated in Figure 11 was employed. This apparatus consists of a cylindrical beaker or container 23 dimensioned as illustrated, and containing 100 cc. of water. A rotary stirrer 24 dimensioned as illustrated was driven by the shaft of an electric motor 26. The motor was connected with a watt meter 22 to enable an accurate determination of the net power input in watts. The stirrer was a simple rectangular paddle as illustrated, disposed in a vertical plane about ¼ inch from the bottom of the container, and having its midpoint attached to the motor shaft. It was driven at a speed of 1525 R. P. M. With the water at a temperature of 21° C., 8.74 grams of my dry magnesium hydroxide product produced according to Example 6, and crushed to minus 200 mesh, was introduced into the container 23 and the stirring apparatus started in operation. Within a period of 4 minutes during which time the net wattage input (representing the stirring energy) measured 15 watts, the magnesium hydroxide had become thoroughly dispersed in the water to form a homogeneous suspension containing 8% by weight of the hydroxide. Several 50 cc. samples of this suspension prepared in the manner described above were placed in 50 cc. cylindrical containers each measuring about 22 mm. in diameter. After these samples had stood for a period of 3 days, they each showed a top layer of clear water ranging from 5 to 10 cc. in depth. This represented settling to the extent of about 10 to 20%.

A microscopic examination of the resulting milk of magnesia showed no noticeable difference between the particle size or the characteristics of the material and the original suspension, and the bulk of the particles in the suspension were less than 3.0 microns in size.

In order to contrast the properties described above with the properties of dry magnesium hydroxide obtained by the direct spray drying of the same magnesium hydroxide suspension as used in Example 6, 8.74 grams of such spray dried magnesium hydroxide was added to the container 23, using the same amount of water, and the stirring apparatus again operated at the same speed specified above. After a period of 4 hours, with the same net energy input of 15 watts, it was found that substantially complete settlement occurred immediately upon stopping the stirring apparatus. Even after continuing the agitation for a period of 8 hours, a very poor suspension was obtained, and upon stopping the stirring apparatus and introducing 50 cc. samples into cylindrical containers as described above, settlement occurred to the extent of over 60 percent in a period of 2 hours, and upon standing for a total period of time of 72 hours, settlement occurred to the extent of about 80%.

It will be evident from the foregoing that my product is distinctly different in its properties from conventionally dried magnesium hydroxide, particularly in that ordinary agitation for a short period of itme serves to produce a highly stable suspension of magnesium hydroxide, such as is suitable for pharmaceutical milk of magnesia. Thus so-called colloidal mills such as have been used in the past to produce milk of magnesia by dispersing magnesium oxide in water, can be avoided. Likewise I avoid the use of magnesium hydroxide paste in the manufacture of milk of magnesia, with resulting saving in transportation and cost of packaging in drums.

Products obtained from Examples 2 to 7 inclusive when dispersed by use of the laboratory equipment described with reference to Figure 11, likewise enable ready dispersion in water to produce relatively stable suspensions. The product obtained from Example 7 was the easiest of all the products to disperse in water to form a stable milk of magnesia. Using the same equipment as described with reference to Figure 11, 8.74 grams of the product obtained from Example 7, crushed to minus 200 mesh, when added to 100 cc. of water, fully dispersed within a period of 2 minutes, using the same net energy input. The dispersion so obtained was relatively stable and when permitted to stand in 50 cc. containers as previously described for a period of 5 days, only very minor settlement occurred to an extent not in excess of about 10%.

The product produced according to Example 7 was also relatively stable with respect to absorption of both moisture and carbon dioxide from the atmosphere. The curves of Figure 4 serve to illustrate the stabilized character of this product, in contrast with magnesium hydroxide made by a direct drying operation from the same original suspension. These curves, numbered 1, 2 and 3 are plotted between percentage of absorption of carbon dioxide and moisture from the atmosphere, and days of exposure to the atmosphere. Curve 1 represents a dry magnesium hydroxide made by direct spray drying of the suspension. This curve is typical of a direct dried magnesium hydroxide. Curve 2 represents a powdered product made in accordance with Example 7. Curve 3 represents a product in lump form, made according to Example 7 before crushing. Both curves 2 and 3 show that the absorption of carbon dioxide and water from the atmosphere is substantially negligible, after the first few days of exposure. On the other hand, for the spray dried material the absorption of moisture and carbon dioxide continued at a substantially constant rate.

Magnesium hydroxide products made in accordance with any one of the foregoing examples, is useful as a pharmaceutical preparation or for the manufacture of pharmaceutical preparations such as pharmaceutical milk of magnesia, or so-called milk of magnesia tablets. To form a stable pharmaceutical milk of magnesia by the use of such products, simple commercial agitating equipment can be used comparable in its agitating action to the laboratory equipment illustrated in Figure 11.

To form a so-called milk of magnesia tablet I have secured good results by mixing a powdered product made in accordance with Example 7 with a small amount of powdered sugar such as lactose, after which the mixture can be compressed into tablets by use of a simple suitable tableting machine. If it is desired to granulate the material to facilitate tableting, this can be done by use of non-aqueous liquids such as acetone. Also one can force the filter cake as produced in Figure 7 through a screen of suitable mesh before drying, in order to have the desired granulation of the dried material.

I attribute the remarkable properties of my magnesium hydroxide product to the fact that the individual particles of the material are not cemented together. When an aqueous suspension of magnesium hydroxide is directly dried to form a dry material, the individual particles become cemented together, and it appears that this accounts for the relatively high apparent density obtained, and for the fact that it is difficult, if not impossible, to redisperse such a material in water to form a stable suspension, irrespective of the particle fineness of the original suspension. In my process the water is removed by use of one or more solvents, thus effecting removal of so-called imbibed water, without an opportunity for the particles to cement together.

The microphotograph of Figure 5 shows a dried magnesium hydroxide such as can be produced in accordance with Example 3, crushed to minus 200 mesh, and at a magnification of 1 to 450. Figure 6 is a microphotograph to the same magnification of a magnesium hydroxide product made in accordance with Example 4, crushed to minus 200 mesh. Figure 8 is a microphotograph to the same magnification, showing a milk of magnesia formed by the dispersion of a product made in accordance with Example 7, with the suspension containing 7.5% of magnesium hydroxide. Figure 7 is a microphotograph like Figure 8, but showing the original suspension of magnesium hydroxide which had been used for all drying experiments. In order to contrast Figures 5, 6 and 7 with a magnesium hydroxide obtained by direct drying of the suspension, I have shown in Figure 9 a microphotograph of magnesium hydroxide made by oven drying, from a magnesium hydroxide suspension identical with the original suspension used in preparing the products shown in Figures 5 and 6. This material was also minus 200 mesh, and the magnification is 1 to 450. Figure 10 is a microphotograph like Figure 9, but showing dried magnesium hydroxide made by spray drying the same suspension. It will be noted that the bulk of the particles in both Figures 9 and 10 are of relatively large size, and are in excess of 3.0 microns in diameter. In contrast with such directly dried products, Figures 5 and 6 show that magnesium hydroxide products made in accordance with my process have the bulk of their particles of relatively small size (i. e. less than 3.0 microns in diameter). What might be considered to be particles of larger size in the photographs of Figures 5 and 6 are friable clusters of individually small size particles which readily disintegrate in water.

In addition to the novel characteristics of the product described above in connection with Examples 1 to 7 inclusive, and the properties of the milk of magnesia made by dispersion of such products in water, I have found that when such products are calcined at elevated temperatures they form light magnesium oxides having apparent densities varying from 6 to 15 pounds per cubic foot. The precise properties of the oxide produced will depend somewhat upon the apparent density of the magnesium hydroxide and upon the corresponding procedure employed. Thus oxides obtained by calcining the products of Examples 3 and 4 give oxides of 7.9 and 7.1 pounds per cubic foot respectively, when the calcining temperature was of the order of 900° C. Lower calcining temperatures without complete conversion gave oxides of high absorptive activity. Thus when the products of Examples 3 and 4 are partially calcined to a temperature not in excess of 650° C. to convert from about 80 to 85% of the hydroxide to oxide, the resulting materials have apparent densities ranging from 6 to 8 pounds per cubic foot, and are highly activated materials useful as adsorbents. Such activated magnesium oxides will afford iodine numbers of the order of 165 to 180. The term "iodine number" as used herein is an index of the adsorptive properties of the material. It can be defined as being one hundred times the milligram equivalents of iodine removed from an iodine solution by one gram of activated material. In carrying out a test to determine iodine number, one makes use of a solution of iodine with carbon tetrachloride, and the solution should contain an ample amount of iodine so that the removal of some iodine by magnesium oxide does not affect further absorption.

It will be apparent from the above that my process makes it possible to prepare a U. S. P. "light oxide" without previous carbonation.

Treatment of the magnesium hydroxide to form a protective coating of magnesium citrate, can also be applied in conjunction with conventional drying methods. For example, I have suspended 100 grams of spray dried magnesium hydroxide in acetone with 5 grams of citric acid, and then the mixture agitated until the liquid showed neutral reaction. The solvent was then removed to form a final dried product. The apparent density was reduced from an initial 31.5 pounds per cubic foot to 29.0 pounds per cubic foot, and the product was found to be relatively stable with respect to absorption of moisture and carbon dioxide when exposed to the atmosphere.

This application is a continuation in part of my co-pending application Serial No. 377,297, filed February 4, 1941, which has become abandoned.

I claim:

1. In a process for the manufacture of magnesium hydroxide products, the steps which comprise, washing a mass of magnesium hydroxide and water with a water miscible non-aqueous organic liquid whereby water is displaced from the magnesium hydroxide, then washing the magnesium hydroxide with a water miscible non-aqueous organic liquid containing small amounts of an aliphatic organic acid, the non-aqueous organic liquid having a boiling point below 100° C. and having at least 2 carbon atoms in its molecules, and then removing residual liquid to form a dry magnesium hydroxide.

2. In a process for the manufacture of magnesium products, the steps which comprise, washing a mass of magnesium hydroxide and water with a water miscible non-aqueous organic liquid miscible with water, then washing the magnesium hydroxide with a water miscible non-aqueous organic liquid containing small amounts of citric acid, the non-aqueous organic liquid having a boiling point below 100° C. and having at least 2 carbon atoms in its molecules, and then removing the residual liquid to form a dry magnesium hydroxide.

3. As a new article of manufacture, dry magnesium hydroxide having its individual particles coated with a minor amount of magnesium citrate, the material having an apparent density of from 5 to 12 pounds per cubic foot, the product being further characterized by its ability to disperse in water without violent agitation to form a stable suspension in which the bulk of the individual particles are less than 3.0 microns in size.

4. In a process for the manufacture of magnesium hydroxide products, the steps which comprise, contacting magnesium hydroxide with a water miscible non-aqueous organic liquid containing small amounts of an aliphatic acid, the non-aqueous organic liquid having a boiling point below 100° C. and having at least 2 carbon atoms in its molecules, causing the acid to react with part but not all of the magnesium hydroxide to form a reaction product as a coating on the magnesium hydroxide, and then removing residual liquid to form a dry material.

5. In a process for the manufacture of magnesium hydroxide products, the steps which comprise contacting magnesium hydroxide with a water miscible non-aqueous organic liquid containing small amounts of citric acid, the non-aqueous organic liquid having a boiling point below 100° C. and having at least 2 carbon atoms in its molecules, causing the acid to react with part but not all of the magnesium hydroxide to form a reaction product as a coating on the magnesium hydroxide, and then removing residual liquid to form a dry material.

GUNTER H. GLOSS.

REFERENCES CITED

The following references are of record in the file of this patent:

UNITED STATES PATENTS

| Number | Name | Date |
|---|---|---|
| 1,674,230 | Seyfferth | June 19, 1928 |
| 1,687,588 | Pearson | Oct. 16, 1928 |
| 1,986,509 | MacIntire | Jan. 1, 1935 |
| 2,093,454 | Kistler | Sept. 21, 1937 |
| 2,119,117 | Schuler et al. | May 31, 1938 |
| 2,138,048 | Vesce | Nov. 29, 1938 |
| 2,138,049 | Vesce | Nov. 29, 1938 |
| 2,236,445 | Pfeiffer | Mar. 25, 1941 |
| 2,249,767 | Kistler | July 22, 1941 |

FOREIGN PATENTS

| Number | Country | Date |
|---|---|---|
| 359,641 | Great Britain | Oct. 29, 1931 |

OTHER REFERENCES

Mellor: "Inorganic and Theoretical Chemistry," vol. 4, pp. 290, 291, Longmans, Green and Co., London, 1923.